Aug. 9, 1955 B. RZEPA 2,714,867
COMBINATION TURNING AND EMERGENCY WARNING INDICATOR
Filed May 15, 1953
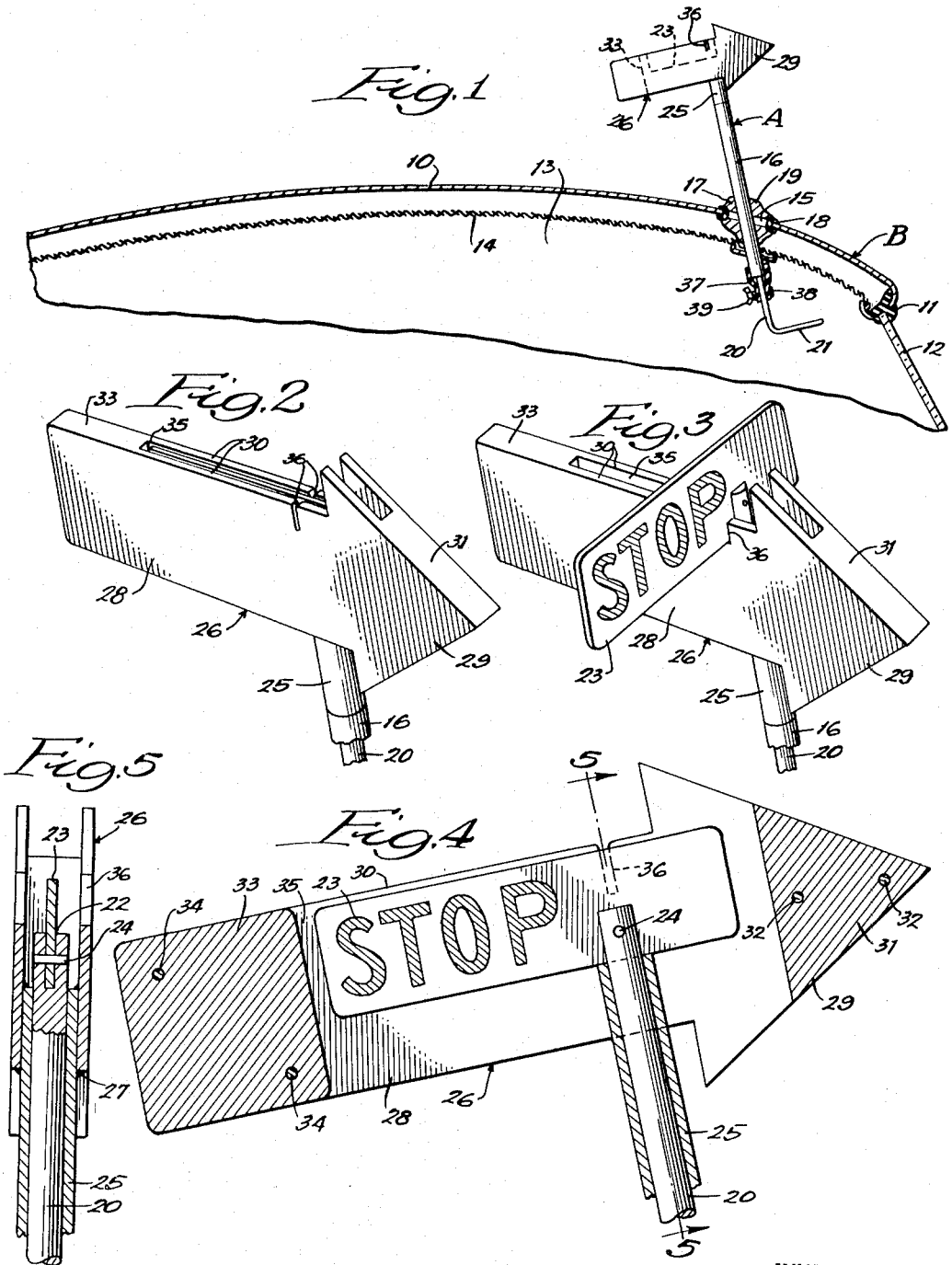
INVENTOR:
Bruno Rzepa,
BY
Dawson, Tilton & Graham,
ATTORNEYS.

United States Patent Office 2,714,867
Patented Aug. 9, 1955

2,714,867

COMBINATION TURNING AND EMERGENCY WARNING INDICATOR

Bruno Rzepa, Chicago, Ill.

Application May 15, 1953, Serial No. 355,300

8 Claims. (Cl. 116—47)

This invention relates to warning devices for use with vehicles, and more particularly to a combination turning indicator and emergency warning indicator especially suitable for use with automobiles, trucks, and the like.

An object of the invention is to provide a combination turning and emergency warning indicator for use with vehicles. Another object of the invention is to provide a combination turning and emergency warning indicator for use with cars, trucks, etc., and wherein the indicators are manually manipulatable and automatically return to the initial at rest position after the vehicle has completed a turn. Still another object of the invention is to provide a turning indicator that is manually operable and is mounted within the roof of a vehicle and is disposed angularly therein and carries at one end a weight whereby the vibratory movement of the vehicle is operative in combination with the weight to automatically return the indicator to the normal starting position after it has been moved to indicate a turn and after the vehicle has completed the turn. A further object of the invention is to provide in combination a turning indicator and an emergency warning indicator; the emergency warning indicator normally being concealed but being manually operable to provide a warning of danger when the operator of the vehicle so desires; the complete device being mounted in the roof of a vehicle with the indicators extending thereabove and a handle for operating the indicators extending into the compartment of the vehicle; and the indicators being weighted at one end whereby the angular disposition of the indicators and the weight is operative in response to vibratory movement of the vehicle to restore the turning indicator to initial position after it has been used to indicate a turn. Additional objects and advantages will appear as the specification proceeds.

An embodiment of the invention is illustrated in the accompanying drawings, in which—

Figure 1 is a broken longitudinal sectional view of a vehicle having the indicator mounted in the roof thereof and in which the indicator apparatus is shown in elevation; Fig. 2 is a broken perspective view of the indicator; Fig. 3 is a broken perspective view similar to that of Fig. 2 but showing the emergency warning indicator in operative position; Fig. 4 is a broken longitudinal sectional view of the indicator taken along the central longitudinal axis thereof; and Fig. 5 is a broken transverse sectional view taken on the line 5—5 of Fig. 4.

The combination turning and emergency warning indicator is designated generally by the letter A and is shown in Fig. 1 in mounted position in the roof of a vehicle that is designated generally with the letter B. The vehicle B may be a car or truck or any similar vehicle and that provides a roof 10 that is turned downwardly at its forward end and has secured thereto a rubber gasket 11 that provides a mounting for the windshield 12. Within the compartment 13 of the vehicle extends a cloth or fabric roof liner 14 that is conventional and is found in nearly all passenger vehicles.

The roof 10 of the vehicle provides therethrough an opening 15 that receives therein the outer tube or support 16 of the indicator A. The outer tube 16 should be rigidly mounted within the roof 10 and any suitable means for accomplishing such a rigid mounting may be provided. For example, the outer tube support 16 might be welded within the roof 10 or the tube might be threaded and nuts and washers provided to secure the tube tightly within the roof. I have shown, however, a rubber mounting washer 17 for this purpose that extends both above and below the roof 10 and is equipped about the peripheral edge thereof with a slotted gasket portion 18 that receives the edge of the roof 10 therein about the opening 15. The gasket portion 18 frictionally engages the roof 10 and is rigidly held thereby. The mounting member 17 must tightly grip the outer tube support 16 so that the tube does not rotate free of the mounting member and relative to the roof 10. Any suitable means may be used to provide a tight bonding between the mounting member 17 and the outer tube 16 and, for example, adhesives that are moisture-impervious may be employed. I have found, however, that completely satisfactory results are obtained where the bore 19 through the mounting member 17 has an internal diameter that is slightly less than the external diameter of the mounting member 16. The resilient mounting member 17 may then be forced over the tube 16 and will tightly grip the same.

The outer tube support 16 extends both above and below the roof 10, and rotatably mounted therein is an inner shaft 20 that extends downwardly from the lower end of the tube 16 and is turned laterally to provide a handle 21. The shaft 20 may be equipped with any type of handle 21 and preferably the handle is in the form of a pointer or has some other indicia thereon that indicates the direction in which the turning indicators are pointed, as will be hereinafter described. At its upper end the shaft 20 extends above the outer tube 16 and is slotted at the upper end, as is seen best in Fig. 5, to provide a recess 22 that receives therein the elongated warning indicator 23. The indicator or warning sign 23 is secured within the slot 22 by a pin 24 that extends both through the warning sign and the bifurcated upper end of the shaft 20. As is shown in Figs. 3 and 4, I prefer to have the word "STOP" boldly written on both sides of the warning indicator 23, but any suitable indicia may be written or printed or stamped, etc., thereon.

Surrounding a portion of the upper end of the shaft 20 and above the upper end of the support tube 16 is a sleeve or bushing 25 that is freely rotatable relative to both the tube support 16 and inner rotatable shaft 20. Rigidly secured to the upper end of the sleeve 25 is the turning indicator that is designated generally with the numeral 26. The turning indicator 26 may be securely fastened to the sleeve 25 in any appropriate manner and I prefer to weld the two members together as I have indicated at 27 in Fig. 5.

The turning indicator 26 includes an elongated body portion 28 that is generally rectangular and carries at its forward end an arrow or pointer 29. Preferably a pair of directional indicators are provided, one on each side of the sleeve 25, and these are spaced apart and are designated for identification with the numeral 30. Preferably each of the members 30 is joined at both the forward and rear ends thereof and as indicated in Fig. 4 a spacer 31 is mounted between the points of the arrow 29 provided by each of the members 30 and is secured therebetween by rivets or pins 32. Preferably the member 31 is of light weight material and should have a thickness that is substantially equal to the external diameter of the sleeve 25. At its rear end each of the members 30 is secured together by a spacer weight 33 that is secured to the members by pins or rivets 34. It should be understood that any securing means may be utilized to join the spacer members 31 and 33 rigidly to the turning indicators 30. Preferably the spacer weight 33 is formed of a relatively heavy material and substantially weights the rear end of the turning indicator 26, and the reason for this will be brought out subsequently.

It is seen that a compartment or space 35 is provided between the two members 30 centrally thereof, and this space is of sufficient size so as to receive the warning indicator 23 and to normally conceal the member therein. I prefer to slot each of the members 30 at 36 and the slots 36 should be of sufficient size so as to receive the warning sign 23 therein, as is illustrated in Fig. 3.

The support tube 16 should be mounted within the roof 10 so that it angles rearwardly with respect to a vertical plane through the roof, and I also prefer to extend the shaft 20 into the compartment 13 and considerably below the end of the outer tube support 16. The shaft 20 is also slidable within the outer tube 16 as well as rotatable therein so that the shaft may be moved upwardly when it is required to display the warning sign 23, as will be subsequently described. I also prefer to provide a resilient friction member 37 about the lower end of the support tube 16 and about the shaft 20. The friction member 37 may be formed of any suitable material, but the material should be resilient and I prefer to use rubber. About the lower end of the member 37 is a clamp 38 provided with a thumb screw 39 to provide adjustment thereof. The member 37 may be tightened about the shaft 20 by manipulation of the clamp thumb screw.

Operation

In operation, the angular disposition of the indicator A relative to the roof 10 and the weight 33 carried at the rear of the turning indicator normally holds the indicator in the position illustrated in Fig. 1 with the arrow 29 pointed forwardly and the handle 21 within the compartment also pointed forwardly. In this position the air rushing past the moving vehicle does not seriously affect the indicator A and no indication of a turn about to be made, etc., is given to other motorists when the sign is in this position. When a turn is to be made the driver of the vehicle grasps the handle 21 and rotates it 90 degrees in the direction in which the turn is to be made. That is, if a left turn is to be made the handle 21 is turned to the left and if a right turn is to be made the handle 21 should be pointed in the opposite direction. Turning the handle 21 forces the rod or shaft 20 to rotate and this would bring about a rotation of the warning sign 23. The warning sign 23, however, is confined within the compartment 35 and when it rotates slightly it is brought into engagement with the turning indicator 26 and thereby carries this member with it in its rotation. The turning indicator 26 is free to rotate since it is carried by the sleeve 25 which is rotatably mounted upon the shaft 20 and relative to the support tube 16.

It is necessary that the turning indicator 26 remain in the position to which it turns for a short period and usually a turn is made so that the drivers in cars both in front and to the rear of the vehicle will have appropriate warning of the turn that is about to be made. By experiment, the clamp 38 is tightened about the lower end of the shaft 20 so as to provide the proper amount of friction that is necessary to maintain the turning indicator 26 in the appropriate direction for a suitable period. After a turn has been made, the weight 33 and the angular disposition of the entire indicator A causes the weighted end of the indicator 26 to swing rearwardly while the turn is being made, and thereafter the weight and the rush of the air by the vehicle is operative in combination with the vibration of the vehicle to accurately align the turning indicator in the initial position that is illustrated in Fig. 1.

When it is necessary or desired to display the warning indicator 23, as when the car may be stalled on a highway or is otherwise stopped in a zone where the stopped vehicle is liable to create a hazard, the driver of the vehicle grasps the handle 21 and pushes upwardly thereon and thereby slides the shaft 20 within the outer support tube 16 and sleeve 25 and this is effective to raise the warning indicator 23 above the upper edge of the turning indicator 26. The weight of the turning indicator 26 and the spacer 31 and spacer weight 33 carried thereby is operative to hold the turning indicator and sleeve 25 down as the shaft 20 and warning sign 23 are raised relative thereto. The driver of the vehicle then rotates the handle 21, after the warning sign 23 has been elevated, to rotate the sign relative to the turning indicator 26. If desired, the warning sign 23 may be rotated to align it with the slots 36 and the shaft 20 then drawn downwardly to bring the warning sign within the slots 36 and insure its being maintained in a position that is readily visible to approaching drivers. The warning sign 23 will remain in this position until the driver makes an effort to return it to the concealed position by first raising it free of the slots 36 and then turning the handle 21 forwardly, and next pulling it downwardly within the cab to bring the warning sign into the compartment 35.

It will be apparent that both the turning and warning indicator may be equipped with reflectors or lights to make them more readily visible at night. Also, if desired, the turning indicators may be provided with writing or other indicia along the face thereof.

While in the foregoing specification an embodiment of the invention has been set out in considerable detail for purposes of illustration, it will be apparent to those skilled in the art that considerable change in these details may be made without departing from the spirit of the invention.

I claim:

1. A combination turning and warning indicator for vehicles, comprising a support member secured within the roof of a vehicle and extending therethrough, a handle-equipped shaft rotatably mounted in said support member and equipped at its upper end with a warning indicator, and a turning indicator rotatably carried by said support member and providing a compartment adapted to receive and substantially conceal the warning indicator therein, said shaft and said warning indicator carried thereby being movable relative to said turning indicator to move the warning indicator bodily outwardly therefrom to selectively display said warning indicator, said shaft being operatively arranged with said turning indicator to selectively rotate the same.

2. The structure of claim 1 in which said support member is angularly disposed relative to the roof of the vehicle to tilt one end of said turning indicator downwardly along the longitudinal axis of the roof, and said turning indicator is weighted at one end.

3. The structure of claim 2 in which said support member is angled rearwardly relative to said vehicle to tilt the rear end of said turning indicator downwardly and said weight is at the rear end of said turning indicator, whereby after a turn has been indicated, said turning indicator is returned automatically to a front to rear position along the roof.

4. A combination turning and warning indicator for use with automobiles and the like, comprising a turning indicator equipped at one end with a pointer and at the other end thereof with a weight, said turning indicator providing a compartment therein adapted to receive and conceal a warning indicator, a warning indicator receivable within said compartment and adapted to be moved bodily therefrom, a support member for said turning indicator and warning indicator and adapted to be rigidly mounted in the roof of an automobile, and means operatively arranged with said turning and warning indicators for selectively rotating said turning indicator to indicate that a turn is to be made while said warning indicator remains concealed therein and for selectively moving said warning indicator and for rotating the same above said turning indicator to bring it into display position.

5. A turning indicator adapted for use with vehicles having a roof, comprising an elongated tube adapted to be rigidly mounted within the roof of an autombile, a shaft rotatably mounted within said tube and movable axially relative thereto, said shaft being equipped at one end thereof with a handle, a turning indicator operatively arranged with said shaft and adapted to be rotated thereby, and a weight carried at one end of said turning indicator while a pointer is provided at the opposite end of said turning indicator, said weight being operative to restore said turning indicator to its initial front to rear position automatically when a turn has been made.

6. The structure of claim 5 in which said turning indicator is angularly mounted within the roof of an automobile so that the weighted end thereof is inclined downwardly and rearwardly.

7. The structure of claim 6 in which a friction member is provided in operative arrangement with said shaft to adjust the freedom of rotation of said shaft within said tube.

8. The structure of claim 5 in which a warning indicator is operatively arranged with said shaft and is normally carried concealed within a compartment provided by said turning indicator while being movable bodily outwardly therefrom.

References Cited in the file of this patent

UNITED STATES PATENTS

| | | |
|---|---|---|
| 1,568,928 | Swanson | Jan. 5, 1926 |
| 2,253,478 | Crawford | Aug. 19, 1941 |